United States Patent [19]

Shtern et al.

[11] 4,272,291
[45] Jun. 9, 1981

[54] HEAT-REFLECTIVE ENAMEL

[76] Inventors: Maria A. Shtern, prospekt Nauki, 11, kv. 87; Nelli I. Levit, prospekt Metallistov, 76, kv. 305; Alla V. Bondarenko, Grazhdansky prospekt, 83, korpus 1, kv. 123; Alexandra K. Kaschentseva, prospekt Kosmonavtov, 21, korpus 1, kv. 23, all of, Leningrad, U.S.S.R.

[21] Appl. No.: 109,105

[22] Filed: Jan. 2, 1980

[51] Int. Cl.$^3$ ............................................. C09D 5/08
[52] U.S. Cl. ........................... 106/14.05; 106/14.25; 106/14.39; 106/14.41; 106/14.42; 106/16; 106/18.26; 106/18.28; 260/37 SB; 260/39 R; 260/42
[58] Field of Search ............... 106/14.05, 14.25, 14.39, 106/14.41, 14.42, 16, 18.26, 18.28

[56] References Cited

U.S. PATENT DOCUMENTS

| | | | |
|---|---|---|---|
| 3,466,181 | 9/1969 | Cooley et al. | 106/193 M |
| 3,577,379 | 5/1971 | Sandler et al. | 260/40 |

FOREIGN PATENT DOCUMENTS

| | | |
|---|---|---|
| 795464 | 5/1958 | United Kingdom . |
| 948270 | 1/1964 | United Kingdom . |

*Primary Examiner*—Lorenzo B. Hayes
*Attorney, Agent, or Firm*—Fleit & Jacobson

[57] ABSTRACT

Disclosed is a heat-reflective enamel comprising a weather resistant vehicle, a pigment, an extender, and a solvent, and containing additionally the product of thermal interaction between titanium dioxide or metatitanic acid, a nickel compound, antimony trioxide, and ammonium dichromate or an alkali metal dichromate, taken in the following amounts, in parts by weight:

titanium dioxide or metatitanic acid based on titanium dioxide: 100 nickel compound thermally decomposed to yield nickel oxide, based on nickel oxide: 3 to 32 antimony trioxide: 15 to 35 ammonium dichromate or an alkali metal dichromate, based on chromium oxide: 2 to 5 with the constituents of the heat-reflective enamel having the following proportions expressed in parts by weight:

vehicle: 100 pigment: 30 to 80 extender: 1 to 60 solvent: 90 to 840 product of thermal interaction between titanium dioxide or metatitanic acid, a nickel compound thermally decomposed to yield nickel oxide, antimony trioxide, and ammonium dichromate or an alkali metal dichromate: 15 to 60.

1 Claim, No Drawings

HEAT-REFLECTIVE ENAMEL

FIELD OF THE INVENTION

The present invention relates to the production of paint-and-varnish coating compositions, and more particularly to heat-reflective enamels.

The present invention can most advantageously be used for protection against atmospheric effects and to reduce heat build-up in metal surfaces, specifically, for coating the exterior surfaces of fuel tanks in aircraft and other applications, those of stationary and transportation tanks for volatile liquid products, and the decks of tankers used to carry liquid fuel.

BACKGROUND OF THE INVENTION

Known in the art are white coloured enamels (cf., e.g., UK Pat. Nos. 948,270 and 795,464) based on the use of acrylic resins and other vehicles and containing as pigments anatase or rutile titanium dioxide, zinc oxide, lead sulphate, lead carbonate, magnesium oxide, and other compounds.

Dark coloured heat-reflective coatings are essential in some applications, thus as deck coatings for oil carrier tankers where light coloured coatings may adversely affect in bright sunlight the working conditions and performance of deck hands.

A need exists in the art therefore for the development of dark coloured heat-reflective enamels.

One commonly known heat reflectance formulation is a green coloured pentalkyd enamel used as a deck coating on oil carrier tankers.

This heat-reflective pentalkyd enamel is an alkyd resin solution with lemon chrome, iron blue and iron oxide red pigments dispersed in it.

Said heat-reflective enamel, however, has poor heat reflectance, insufficient weather resistance, and a short coating life, consistent with the formulation.

Taken together these factors explain high oil product losses and the need for frequent recoating where said enamel is used on storage and transportation tanks for oil products or on oil carrier decks.

Product losses due to evaporation can be reduced by minimizing heat build-up in the coated surfaces. An indirect method for assessing the heat reflectance properties of a coating under laboratory conditions is provided by measuring the temperature of the reverse side of a coated metal specimen irradiated by means of an incandescent lamp.

For the above pentalkyd enamel this temperature runs as high as 75° C., which is indicative of its low heat reflectance characteristics.

For lower heat build-up due to solar radiation in surfaces to be protected, use should be made of enamels that are highly reflective in the visible, and more particularly infrared, spectral regions.

Currently, a dark coloured heat-reflective enamel is known in the art (cf., e.g., U.S. Pat. No. 3,577,379, U.S. Cl. 260–40), incorporating a weather resistant vehicle, pigments, extenders, and a solvent.

Said enamel is obtained by dispersion in a resin solution of a pigment mixture, extenders, driers such as cobalt naphthenate, and various additives such as stabilizers and antioxidants. The pigment mixture combines pigments that are necessary to provide dark colour to the enamel, such as lead chromate, molybdate organe, phthalocyanine blue, etc., with pigments of high infrared reflectance (spectral region of 0.2 to 2.5 microns), such as quinacridone red.

The extenders used in said heat-reflective enamel are the siliceous matter or mixture of siliceous matter and barytes.

The vehicles used are styrenated alkyd resins, chlorinated paraffins and like.

Said heat-reflective enamel is typically formulated as follows, in parts by weight:

Lead chromate: 56.4
Quinacridone red: 6.5
Molybdate orange: 25.2
Phthalocyanine blue: 4.4
Titanium dioxide: 7.4
Magnesium silicate: 122.2
Styrenated alkyd resin: 130.0
Xylene: 325.0
Diethylamine: 0.3
Cobalt naphthenate: 0.6
Antioxidant: 0.6

The formulation is seen to include diethylamine as stabilizer and cobalt naphthenate as drier. The antioxidant can be any conventional type.

The heat reflectance properties of the aforesaid heat-reflective enamel are not sufficiently high, as evidenced by the reverse side temperature of the coated specimen, which is equal to 72° C. Considerable oil product losses are observed at such a level of temperature.

The coating life is not sufficiently long, being equal to nine months.

Furthermore, the formulation contains quinacridone red, the production technology for this pigment being rather complicated, with the process multistage and a large number of by-products formed.

Considering the disadvantages outlined, the heat reflectance enamel as formulated above is not suitable for use as a deck coating for oil product carrier tankers.

SUMMARY OF THE INVENTION

It is an object of the present invention to overcome the afore-mentioned disadvantages.

Another object of the present invention is to provide a heat-reflective enamel having high heat-reflectance properties.

A further object of the present invention is to provide a heat-reflective enamel having an increased service life.

With these and other objects in view, there is provided a heat-reflective enamel comprising a weather resistant vehicle, a pigment, an extender, and a solvent, which enamel, in accordance with the invention, contains additionally the product of thermal interaction between titanium dioxide or metatitanic acid, a nickel compound thermally decomposed to yield nickel oxide, antimony trioxide, and ammonium dichromate or an alkali metal dichromate, taken in the following amounts, in parts by weight:

titanium dioxide or metatitanic acid based on titanium dioxide: 100
nickel compound thermally decomposed to yield nickel oxide, based on nickel oxide: 3 to 32
antimony trioxide: 15 to 35
ammonium dichromate or an alkali metal dichromate, based on chromium oxide: 2 to 5 and in which enamel the constituents have the following proportions expressed in parts by weight:

vehicle: 100
pigment: 30 to 80 extender: 1 to 60
solvent: 90 to 840
product of thermal interaction between titanium dioxide or metatitanic acid, nickel compound thermally decomposed to yield nickel oxide, antimony trioxide, and ammonium dichromate or an alkali metal dichromate: 15 to 60

The heat-reflective enamel formulated as above has higher heat reflectance characteristics compared to the afore-mentioned prior-art enamel, as attested by the reverse-side temperature of the coated specimen, equal to 66° C. and being thus 6° C. lower than that of the prior-art heat reflectance enamel.

The coating life of the heat reflectance enamel formulated as proposed is three months longer over that of the prior-art dark coloured enamel, the protective physical properties being retained over the service period.

The desired heat reflectance level is achieved, and the protective physical characteristics assured, with the enamel constituents used in the proportions as shown above.

The aforesaid and other objects and novel features of the present invention are set forth in the appended claims, and the present invention will be more fully apparent from the detailed description of its embodiments presented hereinunder.

DETAILED DESCRIPTION OF THE EMBODIMENTS

To produce the proposed heat-reflective enamel, the starting ingredients, including pigment, extender, weather resistant vehicle and solvent, are charged into a dissolver mixer which can be any conventional type. The mixture is then pumped into a mill which can be a ball mill, a vibrating mill, or some other milling equipment. Next the milled product goes to a mixer for toning, mixing in of additives and viscosity adjustment to give the finished end-use product.

The pigment used in the formulation is the product of thermal interaction between titanium dioxide or metatitanic acid, a nickel compound thermally decomposed to yield nickel oxide, antimony trioxide, and ammonium dichromate or an alkali metal dichromate. Any inorganic pigments may also be used, such as chromium oxide, zinc oxide, titanium dioxide, iron oxide red, or primer-grade zinc yellow, and, additionally, phthalocyanine blue may be utilized, as an organic pigment.

The extenders usable in the formulation may be any inorganic types such as carbonates known as dolomite and calcite, barytes, or magnesium silicate, also known as talc.

The weather resistant vehicles which can be used include alkyd resins, drying oil fatty acid modified epoxy resins (epoxy ester resins), formaldehyde and diphenylolpropane modified rosin, acrylic resins, polyurethanes, copolymers of vinyl chloride and vinyl acetate, and others.

Suitable solvents may be any organic solvents such as acetone, butanol, xylene, ethanol, butyl acetate, ethylene glycol acetate, methyl ethyl ketone, or mineral spirits.

The thermal-interaction product is obtained as follows. The starting mixture comprising:

100 kg of titanium dioxide or metatitanic acid based on an equivalent amount of titanium dioxide, 3 to 32 kg of nickel sulphate or some other nickel compounds which can be thermally decomposed to give nickel oxide, taken in equivalent amounts based on nickel oxide, 15 to 35 kg of antimony trioxide, 2 to 5 kg of ammonium dichromate or an alkali metal dichromate based on equivalent amounts of chromium oxide, and 25 l of water, is ground by a conventional technique, dried, calcined within a temperature range of 1150° to 1200° C., and wet milled in a ball mill, a vibrating mill, or any other milling equipment.

The product of thermal interaction of titanium dioxide or metatitanic acid, a nickel compound thermally decomposed to yield nickel oxide, antimony trioxide, and ammonium dichromate or an alkali metal dichromate features high lightfastness, chemical resistance (insolubility in acids or alkalis), and water resistance, combined with high pigment properties.

The pigment properties of the product are assessed in terms of the following characteristics: colour, hiding power, oil absorption, and water soluble salts content. The product is yellow in colour, has a hiding power of 65 g/m$^2$, an oil absorption of about 17 to 20 g of oil per 100 g of the pigment product, and a water soluble salts content of 0.2%.

The heat reflectance properties of the coatings are determined under laboratory conditions using the following procedure.

A specimen metal plate is coated on one side with four layers of the enamel to be tested, to a total thickness of 100 to 120 microns. Each enamel layer is dried for 1 hour at 120°±5° C.

The specimen with the dry coating is placed under an incandescent lamp rated at 500° W, mounted horizontally in a plastic foam cell sized 25×140×260 mm and fitted in the bottom with a hole of 20 mm diameter to enable measurements of the reverse side temperature of the specimen to be taken. The distance between cell and lamp is to be such that the specimen temperature on the reverse side coated with a black enamel be equal to 80°±2° C.

Temperature measurements are taken 4 minutes after the initiation of heating, using a miniature-sized electrical thermometer.

The following typical examples will illustrate certain aspects of the present invention, deliniating more clearly the features and advantages specific to it.

EXAMPLE 1

A green coloured heat-reflective enamel formulation, in parts by weight:
Copolymer of butyl acrylate, styrene, methacrylate and methacrylic acid: 100
Chromium oxide: 38
Zinc oxide: 12
Dolomite: 30
Product of thermal interaction between titanium dioxide, nickel nitrate, antimony trioxide and potassium dichromate: 26
Xylene: 65
Butyl acetate: 65

The heat reflectance and weather resistance characteristics of the enamel are presented hereinunder in Table 1.

EXAMPLE 2

A green coloured heat-reflective enamel formulation, in parts by weight:
Polyvinyl acetate: 100
Zinc oxide: 24
Chromium oxide: 44
Talc: 20

Product of thermal interaction between metatitanic acid, nickel carbonate, antimony trioxide and ammonium dichromate: 15
Acetone: 300

The heat reflectance and weather resistance characteristics of the enamel are presented hereinunder in Table 1.

EXAMPLE 3

A brown coloured heat-reflective enamel formulation, in parts by weight:
Polyvinyl butyral: 100
Iron oxide red: 60
Zinc oxide: 20
Micronized baryte: 20
Product of thermal interaction between titanium dioxide, nickel sulphate, antimony trioxide and ammonium dichromate: 38
Butanol: 250
Ethanol: 340
Acetone: 250

The heat reflectance and weather resistance characteristics of the enamel are presented hereinunder in Table 1.

EXAMPLE 4

A torquoise coloured heat-reflective enamel formulation, in parts by mass:
Melamine-formaldehyde resin: 100
Zinc yellow (primer grade): 22
Phthalocyanine blue: 8
Calcite: 50
Product of thermal interaction between metatitanic acid, nickel sulphate, antimony trioxide and ammonium dichromate: 60
Xylene: 65
Butanol: 65

The heat reflectance and weather resistance characteristics of the enamel are presented hereinunder in Table 1.

EXAMPLE 5

A white coloured heat-reflective enamel formulation, in parts by weight:
Methyl phenyl siloxane resin: 100
Titanium dioxide: 68
Mica: 60
Product of thermal interaction between metatitanic acid, nickel sulphate, antimony trioxide and ammonium dichromate: 15
Xylene: 60

The heat reflectance and weather resistance characteristics of the enamel are presented hereinunder in Table 1.

EXAMPLE 6

A yellowish-shaded white coloured heat-reflective enamel formulation, in parts by weight:
Trimethylolpropane-modified phthalic saturated polyester: 45
Polyisocyanate biuret: 55
Titanium dioxide: 50
Talc: 1
Product of thermal interaction between titanium dioxide, nickel nitrate, antimony trioxide and potassium dichromate: 20
Ethyl glycol acetate: 30
Xylene: 30
Butyl acetate: 15
Methyl ethyl ketone: 15

The heat reflectance and weather resistance characteristics of the enamel are presented hereinunder in Table 1.

EXAMPLE 7

A turquoise coloured heat-reflective enamel formulation, in parts by weight:
Copolymer of vinyl chloride and vinyl acetate: 100
Zinc yellow (primer grade): 42
Phthalocyanine blue: 8
Micronized baryte: 20
Product of thermal interaction between metatitanic acid, nickel carbonate, antimony trioxide and ammonium dichromate: 32
Acetone: 130
Butyl acetate: 60
Xylene: 310

The heat reflectance and weather resistance characteristics of the enamel are presented hereinunder in Table 1.

EXAMPLE 8

A green coloured heat-reflective enamel formulation, in parts by weight:
Epoxy ester resin: 100
Chromium oxide: 38
Zinc oxide: 18
Micronized talc: 22
Product of thermal interaction between titanium dioxide, nickel sulphate, antimony trioxide and ammonium dichromate: 26
Xylene: 130

The heat reflectance and weather resistance characteristics of the enamel are presented hereinunder in Table 1.

EXAMPLE 9

A maroon coloured heat-reflective enamel formulation, in parts by weight:
Epoxy ester resin: 100
Iron oxide red: 50
Zinc oxide: 30
Micronized baryte: 34
Product of thermal interaction between titanium dioxide, nickel carbonate, antimony trioxide and ammonium dichromate: 38
Cellosolve: 30
Xylene: 110

The heat reflectance and weather resistance characteristics of the enamel are presented hereinunder in Table 1.

EXAMPLE 10

A green coloured heat-reflective enamel formulation, in parts by weight:
Alkyd resin: 100
Zinc oxide: 24
Chromium oxide: 44
Talc: 28
Product of thermal interaction between metatitanic acid, nickel, carbonate, antimony trioxide and ammonium dichromate: 32
Mineral spirits: 150

The heat reflectance and weather resistance characteristics of the enamel are presented hereinunder in Table 1.

EXAMPLE 11 a green coloured heat-reflective enamel formulation, in parts by weight:
Oleoresinous vehicle: 100
Zinc yellow (primer grade): 62
Phthalocyanine blue: 8
Micronized baryte: 28
Product of thermal interaction between metatitanic acid, nickel sulphate, antimony trioxide and ammonium dichromate: 32
Mineral spirits and xylene: 135

The heat reflectance and weather resistance characteristics of the enamel are presented hereinunder in Table 1.

Tabulated below are the heat reflectance and weather resistance characteristics of the proposed enamel coatings, all other physical properties of the coating films (tensile and flexural strength, hardness, adhesion, etc.) being equal.

TABLE 1

| Characteristics | Unit of measure | Example Nos. | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Reverse side temperature of coated specimen | °C. | 65 | 65 | 67 | 65 | 66 | 67 | 66 | 67 | 65 | 66 | 66 |
| Exposure to atmosphere | month | 18 | 22 | 12 | 12 | 15 | 18 | 12 | 12 | 12 | 12 | 12 |

We claim:

1. In a heat-reflective enamel comprising, by weight, 100 parts of a weather resistant vehicle, 30 to 80 parts of a pigment, 1 to 60 parts of and extender, 90 to 840 parts of the a solvent; improvement comprising 15 to 60 parts of the ground product obtained by the thermal interaction between a compound selected from the group consisting of titanium dioxide and metatitanic acid, a nickel compound, antimony trioxide, and a compound selected from the group consisting of ammonium dichromate and an alkali metal dichromate, taken in the following amounts, in parts by weight:

compounds selected from the group consisting of titanium dioxide and metatitanic acid, based on titanium dioxide: 100 nickel compound thermally decomposed to yield nickel oxide, based on nickel oxide: 3 to 32 antimony trioxide: 15 to 35 compounds selected from the group consisting of ammonium dichromate or an alkali metal dichromate, based on chromium oxide: 2 to 5.

* * * * *